(12) United States Patent
Park et al.

(10) Patent No.: US 8,248,553 B2
(45) Date of Patent: Aug. 21, 2012

(54) LIQUID CRYSTAL DISPLAY PANEL OF LINE ON GLASS TYPE AND METHOD OF FABRICATING THE SAME

(75) Inventors: Dae Lim Park, Chilgok-kun (KR); Seong Soo Hwang, Kyoungsangbuk-do (KR); Su Hwan Moon, Kyoungsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 619 days.

(21) Appl. No.: 10/300,778

(22) Filed: Nov. 21, 2002

(65) Prior Publication Data
US 2003/0117564 A1 Jun. 26, 2003

(30) Foreign Application Priority Data
Dec. 20, 2001 (KR) .................................. 2001-81559

(51) Int. Cl.
*G02F 1/136* (2006.01)
(52) U.S. Cl. ........................................................ 349/52
(58) Field of Classification Search .................. 349/149, 349/150, 151, 152, 52
See application file for complete search history.

(56) References Cited

U.S. PATENT DOCUMENTS

| | | | |
|---|---|---|---|
| 6,313,889 B1 * | 11/2001 | Song et al. | 349/54 |
| 6,373,479 B1 * | 4/2002 | Moon | 345/211 |
| 6,404,477 B1 * | 6/2002 | Fujiwara et al. | 349/149 |
| 6,587,161 B1 * | 7/2003 | Yamamoto et al. | 349/43 |
| 6,624,857 B1 * | 9/2003 | Nagata et al. | 349/54 |
| 2001/0026345 A1 * | 10/2001 | Park et al. | 349/149 |
| 2003/0112382 A1 * | 6/2003 | Takahashi et al. | 349/43 |

* cited by examiner

*Primary Examiner* — Timothy L Rude
(74) *Attorney, Agent, or Firm* — McKenna, Long and Aldridge, LLP.

(57) ABSTRACT

A LOG-type liquid crystal display panel and a fabricating method thereof that reduces a line resistance of a LOG-type signal line group within the confined area. In the panel, a picture display part has a plurality of liquid crystal cells, each of which is arranged at each crossing area between gate lines and data lines. Line on glass type signal lines are provided at an outer area of the picture display part by a line on glass system to apply driving signals required for driver integrated circuits for driving the gate lines and the data lines and to connect the driver integrated circuits to each other. The line on glass type signal lines are separately provided at different metal layers having an insulating film therebetween.

5 Claims, 5 Drawing Sheets

LIQUID CRYSTAL DISPLAY PANEL OF LINE ON GLASS TYPE AND METHOD OF FABRICATING THE SAME

This application claims the benefit of Korean Patent Application No. 2001-81559, filed on Dec. 20, 2001, which is hereby incorporated by reference for all purposes as if fully set forth herein.

BACKGROUND OF THE INVENTION

1. Field of the Invention

The present invention relates to a liquid crystal display, and more particularly to a liquid crystal display panel of line on glass (LOG) type and a fabricating method thereof that is adaptive for minimizing a line resistance of LOG-type patterns provided on the liquid crystal display panel.

2. Description of the Related Art

Generally, a liquid crystal display (LCD) controls a light transmittance of a liquid crystal using an electric field to display a picture. To this end, the LCD includes a liquid crystal display panel having liquid crystal cells arranged in a matrix type, and a driving circuit for driving the liquid crystal display panel.

In the liquid crystal display panel, gate lines and data lines are arranged in such a manner to cross each other. The liquid crystal cell is positioned at each area where the gate lines cross the data lines. The liquid crystal display panel is provided with a pixel electrode and a common electrode for applying an electric field to each of the liquid crystal cells. Each pixel electrode is connected, via source and drain electrodes of a thin film transistor as a switching device, to any one of data lines. The gate electrode of the thin film transistor is connected to any one of the gate lines allowing a pixel voltage signal to be applied to the pixel electrodes for each one gate line.

The driving circuit includes a gate driver for driving the gate lines, a data driver for driving the data lines, a timing controller for controlling the gate driver and the data driver, and a power supply for supplying various driving voltages used in the LCD. The timing controller controls a driving timing of the gate driver and the data driver and applies a pixel data signal to the data driver. The power supply generates driving voltages such as a common voltage Vcom, a gate high voltage Vgh and a gate low voltage Vgl, etc. The gate driver sequentially applies a scanning signal to the gate lines to sequentially drive the liquid crystal cells on the liquid crystal display panel one line by one line. The data driver applies a data voltage signal to each of the data lines whenever the gate signal is applied to any one of the gate lines. Accordingly, the LCD controls a light transmittance by an electric field applied between the pixel electrode and the common electrode in accordance with the pixel voltage signal for each liquid crystal cell, to thereby display a picture.

The data driver and the gate driver directly connected to the liquid crystal display panel are integrated into a plurality of integrated circuits (ICs). Each of the data driver IC and the gate driver IC are mounted in a tape carrier package (TCP) to be connected to the liquid crystal display panel by a tape automated bonding (TAB) system, or mounted onto the liquid crystal display panel by a chip on glass (COG) system.

Herein, the driver ICs connected, via the TCP, to the liquid crystal display panel by the TAB system receives control signals and direct current voltage signals inputted from the exterior over signal lines mounted onto a printed circuit board (PCB) connected to the TCP, and are connected to each other. More specifically, the data driver ICs are connected, in series, via signal lines mounted onto the data PCB, to each other, and commonly receive control signals from the timing control signal, a pixel data signal and driving voltages from the power supply. The gate driver ICs are connected, in series, via signal lines mounted onto the gate PCB, and commonly receive control signals from the timing controller and driving voltages from the power supply.

The driver ICs mounted onto the liquid crystal display panel by the COG system are connected to each other by a line on glass (LOG) system in which signal lines are mounted on the liquid crystal display panel, that is, a lower glass, and receive control signals from the timing controller and the power supply and driving voltages.

Recently, even when the driver ICs are connected to the liquid crystal display panel by the TAB system, the LOG system is adopted to eliminate the PCB, thereby permitting the liquid crystal display to be manufactured into a thinner type. Particularly, signal lines connected to the gate driver ICs requiring relatively small signal lines are provided on the liquid crystal display panel by the LOG system to thereby eliminate the gate PCB. In other words, the gate driver ICs of TAB system are connected, in series, to each other over signal lines mounted onto the lower glass of the liquid crystal display panel, and commonly receive control signals and driving voltage signals, which are hereinafter referred to as "gate driving signals".

For instance, as shown in FIG. 1, the liquid crystal display omitting the gate PCB by utilizing LOG-type signal wiring includes a liquid crystal display panel 1, a plurality of data TCPs 8 connected between the liquid crystal display panel 1 and a data PCB 12, a plurality of gate TCPs connected to other side of the liquid crystal display panel 1, data driver ICs 10 mounted in the data TCPs 8, and gate driver ICs mounted in the gate TCPs 14.

The liquid crystal display panel 1 includes a lower substrate 2 provided with various signal lines and a thin film transistor array, an upper substrate provided with a color filter array, and a liquid crystal injected between the lower substrate 2 and the upper substrate 4. Such a liquid crystal display panel 1 is provided with a picture display area 21 that consists of liquid crystal cells provided at crossings between gate lines 20 and data lines 18 for the purpose of displaying a picture. At the outer area of the lower substrate 2 located at the outer side of the picture display area 21, data pads are extended from the data lines 18 and gate pads are extended from the gate lines 20. Further, a LOG-type signal line group LOGG for transferring gate driving signals applied to the gate driver IC 16 is positioned at the outer area of the lower substrate 2.

The data TCP 8 is mounted with the data driver IC 10, and is provided with input pads 24 and output pads 25 electrically connected to the data driver IC 10. The input pads 243 of the data TCP 8 are electrically connected to the output pads of the data PCB 12 while the output pads 25 thereof are electrically connected to the data pads on the lower substrate 2. Particularly, the first data TCP 8 is further provided with a gate driving signal transmission group 22 electrically connected to the LOG-type signal line group LOGG on the lower substrate 2. This gate driving signal transmission group 22 applies gate driving signals from the timing controller and the power supply, via the data PCB 12, to the LOG-type signal line group LOGG.

The data driver ICs 10 convert digital pixel data signals into analog pixel voltage signals to apply them to the data lines 18 on the liquid crystal display panel.

Similarly, the gate TCP 14 is mounted with a gate driver IC 16, and is provided with a gate driving signal transmission line group 28 electrically connected to the gate driver IC 16 and output pads 30. The gate driving signal transmission line group 28 is electrically connected to the LOG-type signal line group LOGG on the lower substrate 2 while the output pads 30 are electrically connected to the gate pads on the lower substrate 2. As shown in FIG. 1, the LOG-type signal line group LOGG is connected between the first data TCP 8 and a first gate TCP 14 and between the adjacent gate TCPs 14.

Each gate driver IC 16 sequentially applies a scanning signal, that is, a gate high voltage signal Vgh to a gate line 20 in response to input control signals. Further, the gate driver IC 16 applies a gate low voltage signal Vgl to the gate line 20 in the remaining interval other than an interval supplied with the gate high voltage signal Vgh.

The LOG-type signal line group LOGG usually consists of signal lines for supplying direct current voltage signals such as a gate high voltage signal Vgh, a gate low voltage signal Vgl, a common voltage signal Vcom, a ground voltage signal GND and a supply voltage signal Vcc and gate control signals such as a gate start pulse GSP, a gate shift clock signal GSC and a gate enable signal GOE.

FIG. 2A is a plan view corresponding to a portion "A" between the first data TCP 8 and a first gate TCP 14 as a part of the LOG-type signal line group LOGG in FIG. 1 and FIG. 2B is a sectional view taken along the I-I' line in FIG. 2A. As shown in FIGS. 2A and 2B, such LOG-type signal line group LOGG is arranged, in parallel, in a fine pattern at a very confined narrow space like a pad portion positioned of an outer area of a picture display part 21. The LOG-type signal line group LOGG includes a LOG-type signal line 26 supplying the gate low voltage VGL and other LOG-type signal lines 27 supplying the gate high voltage signal Vgh, the common voltage signal Vcom, the ground voltage signal GND, the supply voltage signal Vcc and a plurality gate control signals, respectively. The LOG-type signal line group LOGG is provided on the lower substrate 2, and a gate insulating film 34 and a protective film 36 are disposed on the LOG-type signal line group LOGG. The LOG-type signal line group LOGG is formed from a gate metal layer having a relatively large resistivity of about 0.046 Ω upon a forming process of the gate lines 20. Thus, the LOG-type signal line group LOGG has a larger resistance component than the signal lines formed from a copper film at an existing gate PCB. As a resistance value of the LOG-type signal line group LOGG is in proportion to a line length, its line resistance value is increased, as it becomes more distant from the data PCB 12, to thereby attenuate a gate driving signal. As a result, gate driving signals transferred over the LOG-type signal line group LOGG are distorted due to its line voltage value to cause a deterioration in a quality of a picture displayed on the picture display part 21.

More specifically, a voltage difference occurs from a gate driving signal applied for each gate driver IC 16 due to a line resistance value of the LOG-type signal line group LOGG. Since a line resistance value according to a length of the LOG-type signal line group LOGG is increased more as the LOG-type signal line group LOGG becomes more distant from the data PCB 12, a gate driving signal is attenuated. Due to a difference of gate driving signals applied for each gate driver IC 16, a cross-line phenomenon occurs between horizontal line blocks connected to different gate driver ICs at the picture display part 21, thereby causing a divided display of the field.

Particularly, this cross-line phenomenon between horizontal line blocks is caused by the fact that a gate low voltage Vgl of a plurality of gate driving signals is supplied differently for each gate driver TCP 14, that is, each gate driver IC 16 due to a line resistance of the LOG-type signal line group LOGG. A distortion of the gate low voltage Vgl in the gate driving signals supplied over the LOG-type signal line group LOGG greatly affects a picture quality of the picture display part 21. Herein, the gate low voltage Vgl allows a pixel voltage charged in the liquid crystal cell in a gate high voltage (Vgh) interval to be maintained until the next pixel voltage is charged. This is because the charged pixel voltage is varied when the gate low voltage Vgl is distorted.

In order to prevent an attenuation of a gate driving signal, particularly a gate low voltage caused by a line resistance of the LOG-type signal line group LOGG, the LOG-type signal line group LOGG must have a large sectional view or a small resistivity to thereby attenuate a resistance component.

However, since an outer area of the picture display part 21 provided with the LOG-type signal line group LOGG is confined, there exists a limit in enlarging a sectional area of the LOG-type signal line group LOGG. Also, since it is formed from a gate metal layer, there exists a limit in reducing a resistivity value of the LOG-type signal line group LOGG. Therefore, a scheme for reducing a line resistance of the LOG-type signal line group LOGG arranged in a fine pattern within the confined area is required.

SUMMARY OF THE INVENTION

Accordingly, the present invention is directed to a liquid crystal display panel of line on glass (LOG) type and method of fabricating the same that substantially obviates one or more of the problems due to limitations and disadvantages of the related art.

An advantage of the present invention is to reduce a line resistance of a LOG-type signal line group within the confined area.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a LOG-type liquid crystal display panel according to one aspect of the present invention includes a picture display part having a plurality of liquid crystal cells, each of which is arranged at each crossing area between gate lines and data lines; and line on glass type signal lines being provided at an outer area of the picture display part by a line on glass system, for applying driving signals required for driver integrated circuits for driving the gate lines and the data lines and for connecting the driver integrated circuits to each other, wherein the line on glass type signal lines are separately provided at different metal layers having an insulating film therebetween.

In the line on glass type liquid crystal display panel, the line on glass type signal lines are provided separately at a gate metal layer and a source/drain metal layer that have the gate insulating film there between.

The line on glass type signal lines supply gate driving signal required for the gate driver integrated circuits for driving the gate lines and a common voltage required for a common electrode included in the picture display part.

A gate low voltage signal line for supplying a gate low voltage signal in the line on glass type signal lines is formed from a gate metal layer while the remaining gate driving signal lines for transferring the remaining gate driving voltage signals excluding the gate low voltage signal is formed from a source/drain metal layer.

Otherwise, a gate low voltage signal line for supplying a gate low voltage signal in the line on glass type signal lines is formed from a source/drain metal layer while the remaining gate driving signal lines for transferring the remaining gate driving voltage signals excluding the gate low voltage signal is formed from a gate metal layer.

The gate low voltage signal line is provided such that it has a sectional area as large as possible within a confined area where the gate line on glass type signal lines are formed at the corresponding metal layer.

In another aspect of the present invention, a method of fabricating a line on glass type liquid crystal display panel includes a picture display part having a plurality of liquid crystal cells, each of which is arranged at each crossing area between gate lines and data lines, and line on glass type signal lines provided at an outer area of the picture display part by a line on glass system to apply driving signals required for driver integrated circuits for driving the gate lines and the data lines and connect the driver integrated circuits to each other, comprising forming a portion of the line on glass type signal lines, along with a gate electrode and gate lines of a thin film transistor, by depositing a gate metal onto a lower substrate and then patterning the gate metal; forming an active layer of the thin film transistor by entirely coating a gate insulating film and depositing a semiconductor material and then patterning the gate insulating film and the semiconductor material; forming a remaining line portion on glass type signal lines, along with source/drain electrodes and data lines of the thin film transistor, by depositing a source/drain metal and then patterning the source/drain metals; defining contact holes for exposing pads of the gate line and the data line, the drain electrode of the thin film transistor and pads of the line on glass type signal lines after entirely coating a protective film; and forming a pixel electrode connected to the drain electrode and a protective electrode connected to the pads of the gate line and the data line and the pads of the line on glass signal lines by depositing a transparent conductive material and then patterning the transparent conductive material.

In the method, a gate low voltage signal line for supplying a gate low voltage signal in the line on glass type signal lines is formed from a gate metal layer while the remaining gate driving signal lines for transferring the remaining gate driving voltage signals excluding the gate low voltage signal is formed from a source/drain metal layer.

Otherwise, a gate low voltage signal line for supplying a gate low voltage signal in the line on glass type signal lines is formed from a source/drain metal layer while the remaining gate driving signal lines for transferring the remaining gate driving voltage signals excluding the gate low voltage signal is formed from a gate metal layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
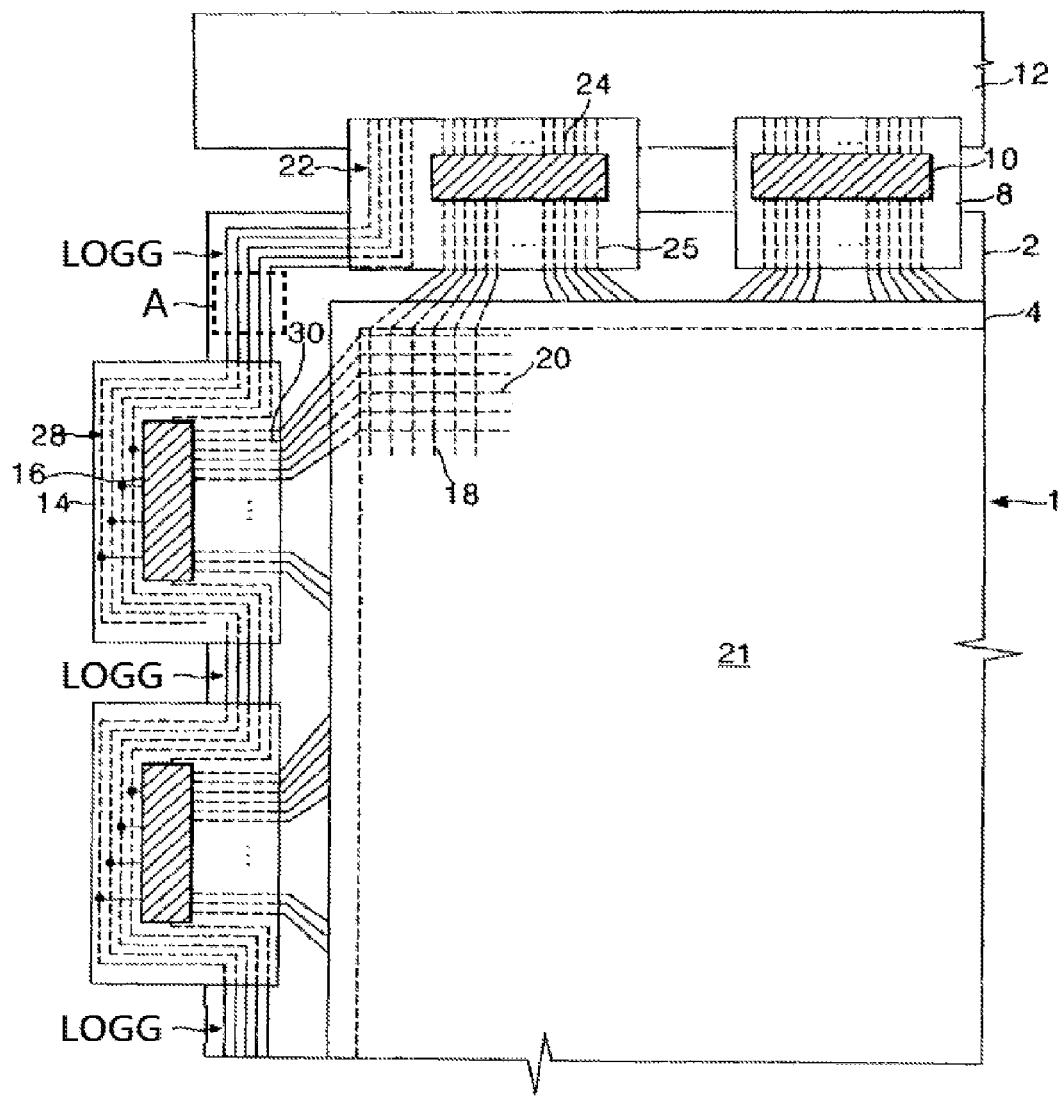
FIG. 1 is a schematic plan view showing a configuration of a conventional line on glass type liquid crystal display.
Figure 2A:
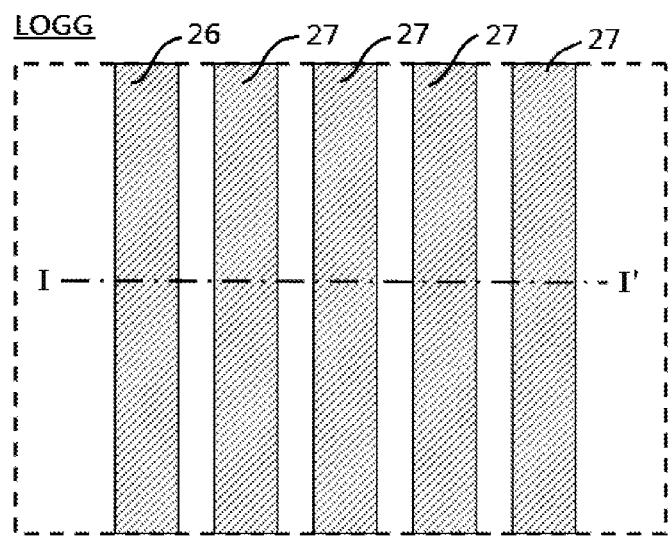
FIG. 2A is a plan view corresponding to a portion "A" showing the line on glass type signal line group in FIG. 1
Figure 2B:
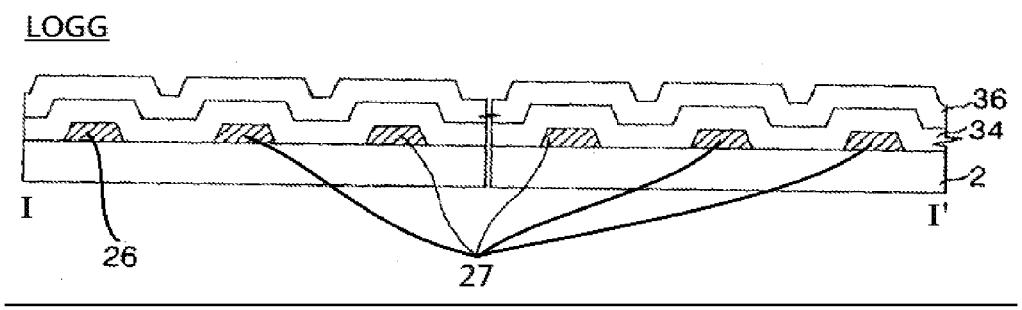
FIG. 2B is a sectional view of the line on glass type signal line group taken along the I-I' line in FIG. 2A.
Figure 3A:
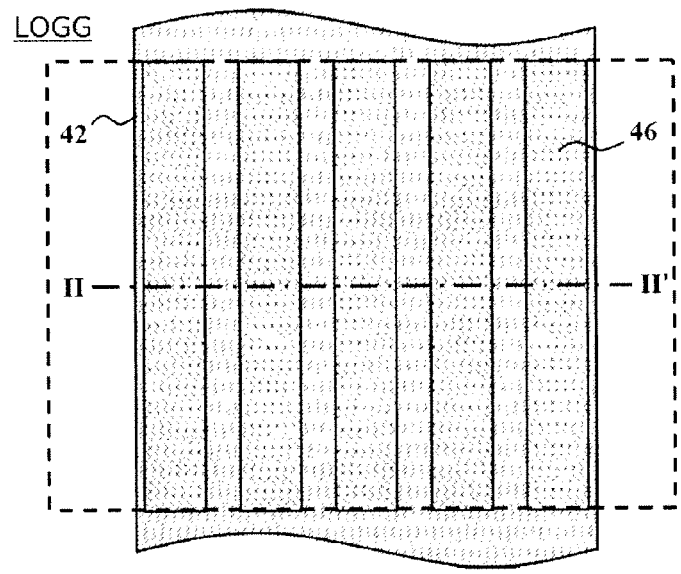
FIG. 3A is a plan view corresponding to the portion "B", as shown in FIG. 5, showing a structure of a line on glass type signal line group according to an embodiment of the present invention
Figure 3B:
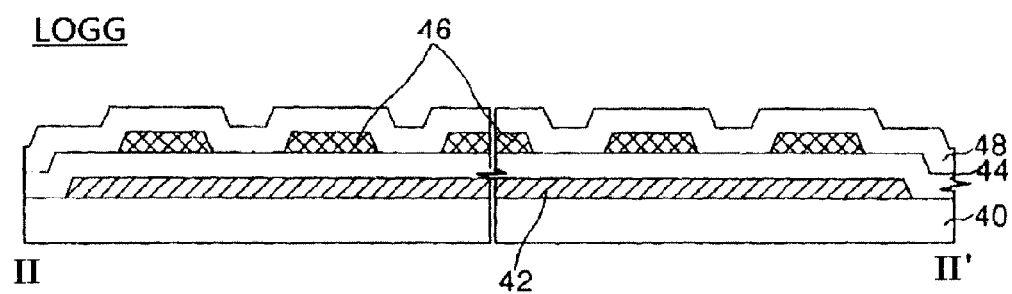
FIG. 3B is a sectional view taken along the II-II' line in FIG. 3A.
Figure 5:
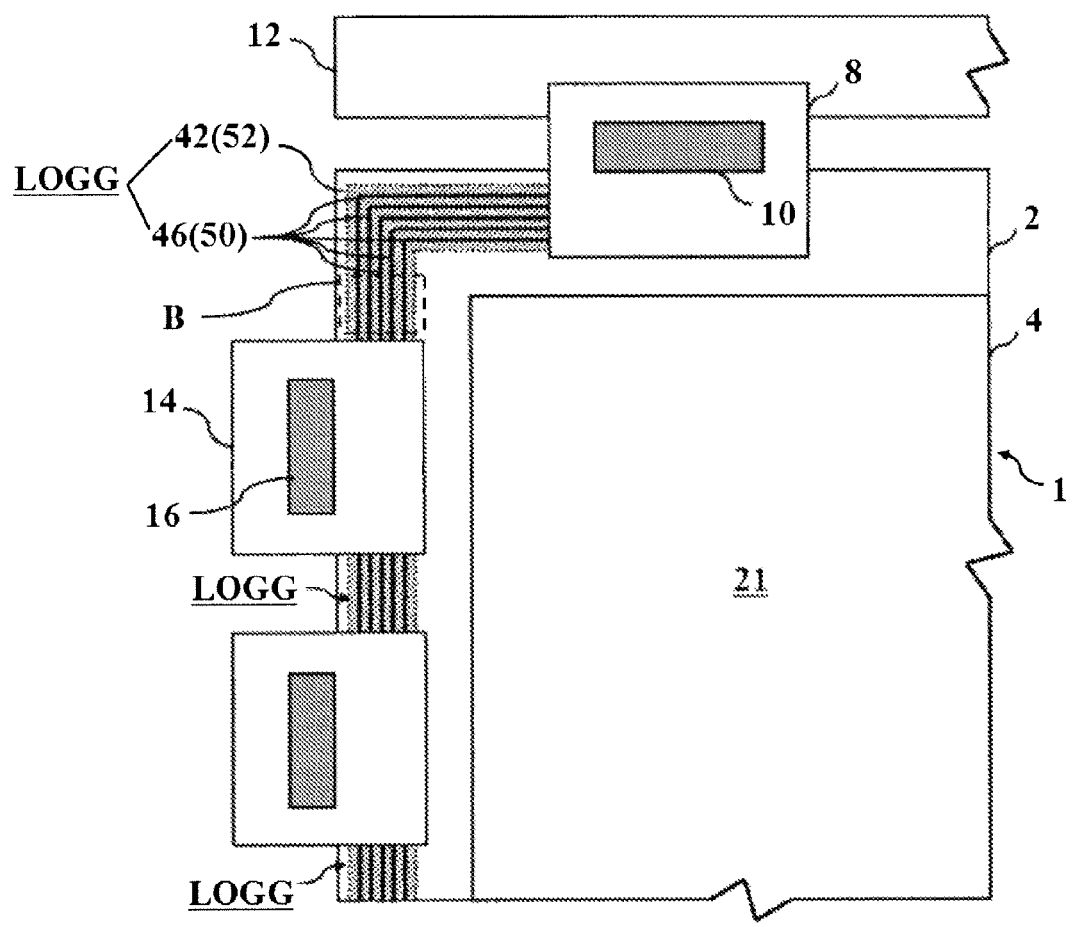
FIG. 5 is a schematic plan view showing a configuration of a line on glass type liquid crystal display according to a embodiment of the present invention.

FIG. 3A is a plan view showing a portion, corresponding to the portion "B" between the first data TCP 8 and a first gate TCP 14 as a part of the LOG-type signal line group LOGG in FIG. 5, where a line on glass (LOG) type signal line group is provided in a liquid crystal display panel according to an embodiment of the present invention and FIG. 3B is a sectional view taken along the II-II' line in FIG. 3A.

Referring to FIGS. 5, 3A and 3B, the LOG-type signal line group LOGG is located between the first data TCP 8 and a first gate TCP 14 and between the adjacent gate TCPs 14 at an outer area of a picture display part (not shown) including a plurality of liquid crystal cells to supply gate driving signals required for gate driver ICs. For example, the LOG-type signal line group LOGG applies direct current voltage signals from a power supply such as a gate high voltage signal Vgh, a gate low voltage signal Vgl, a common voltage signal Vcom, a ground voltage signal GND and a supply voltage signal Vcc and gate control signals such as a gate start pulse GSP, a gate shift clock signal GSC and a gate enable signal GOE. Such LOG-type signal line group LOGG consists of a gate low voltage signal line 42 provided between a lower substrate 40 and a gate insulating film 44, and other gate driving signal lines 46 provided between the gate insulating film 44 and a protective film 48.

In the liquid crystal display panel shown in FIGS. 3A and 3B, since the LOG-type signal line group LOGG is provided separately at different metal layers having the gate insulating film 44 therebetween, an area of the LOG-type signal line group LOGG can be set as large as possible even within the confined area. Particularly, the gate low voltage signal line 42 for transferring a gate low voltage Vgl critically affecting picture quality of the picture display part in the gate driving signals is formed from a gate metal, whereas other gate driving signal lines 46 are formed from a source/drain metal. In this case, other gate driving signal lines 46 provided at the source/drain metal layer are positioned in such a manner to overlap with the gate low voltage signal line 42 provided at the source/drain metal layer. Thus, an area, that is, a line width of the gate low voltage signal line 42 is set as large as possible such that it corresponds to the entire outer area, thereby minimizing resistance value enough to not affect picture quality. Further, the LOG-type signal lines 46 for transferring the remaining gate driving voltages excluding the gate low voltage Vgl can have a larger line width than the conventional LOG-type signal lines provided at the gate metal layer along with the gate low voltage signal line, so that their resistance value also can be reduced. In addition, since a resistance of the source/drain metal is smaller than that of the gate metal, the LOG-type signal lines 46 for transferring the remaining gate driving voltages has a resistance value which is reduced more than the conventional LOG-type signal lines provided at the gate metal layer.

Hereinafter, a method of manufacturing such a LOG-type signal line group LOGG will be described in conjunction with a thin film transistor array process of the lower substrate however, the method is not shown in the drawings.

First, a gate metal is deposited onto the lower substrate 40 and then patterned, to thereby provide the LOG-type gate low voltage signal line 42 along with gate electrodes, gate lines and gate pads of the thin film transistor. Next, an active layer of the thin film transistor is formed by entirely coating the gate insulating film 44 thereon and thereafter depositing amorphous silicon and then patterning. Subsequently, a source/drain metal is deposited and then patterned to thereby provide the LOG-type signal lines 46 for transferring gate driving signals other than the gate low voltage Vgl along with source/drain electrodes, data lines and data pads of the thin film transistor. After the protective film 48 was entirely coated, contact holes for exposing gate pads and data pads, pads of the LOG-type signal line group LOGG and a drain electrode of the thin film transistor, etc. are provided. Herein, the gate pads and the pads of the LOG-type gate low voltage signal line 42 provided at the gate metal layer are exposed via a contact hole passing through the gate insulating film 44 and the protective film 48, whereas the drain electrode, the data pads and the pads of the remaining LOG-type signal lines 46 provided at the source/drain metal layer are exposed via a contact hole passing through the protective film 48. Finally, a transparent conductive material is deposited and then patterned to thereby provide a pixel electrode connected to the drain electrode and a protective electrode connected to the gate pads, the data pads and the pads of the LOG-type signal line group LOGG.

Figure 4A:
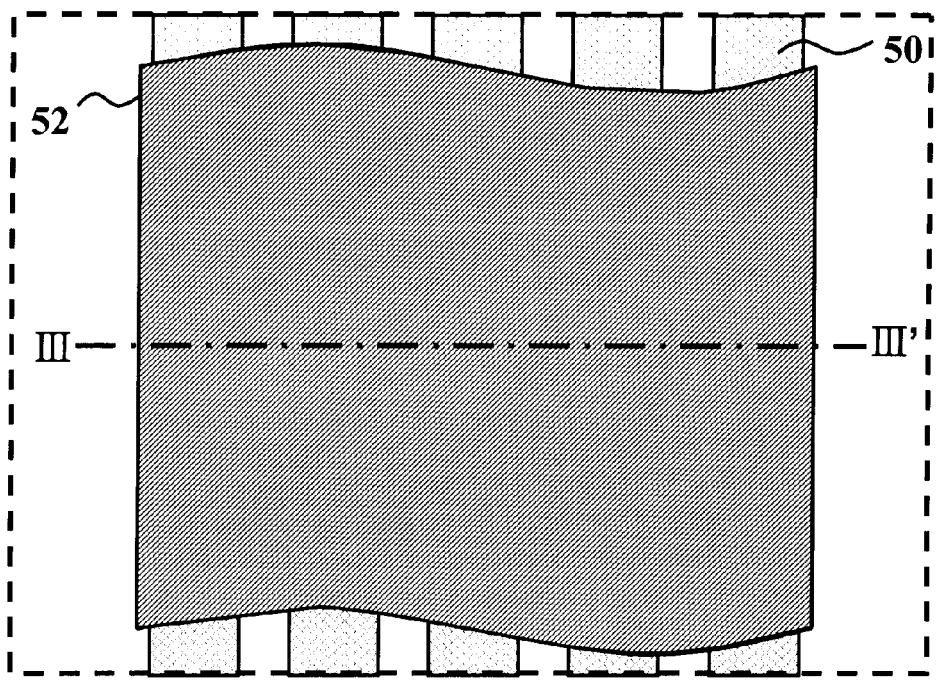
FIG. 4A is a plan view corresponding to the portion "B", as shown in FIG. 5, showing a structure of a line on glass type signal line group according to another embodiment of the present invention
Figure 4B:
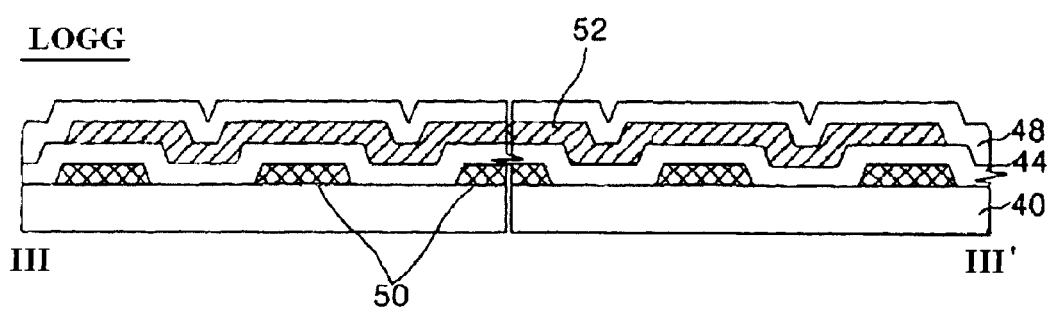
FIG. 4B is a sectional view taken along the III-III' line in FIG. 4A.

FIG. 4A is a plan view showing a portion, corresponding to the portion "B" between the first data TCP 8 and a first gate TCP 14 as a part of the LOG-type signal line group LOGG in FIG. 5, where a LOG-type signal line group LOGG is provided in a liquid crystal display panel according to another embodiment of the present invention and FIG. 4B is a sectional view taken along the III-III' line in FIG. 4A. A LOG-type signal line group LOGG shown in FIGS. 4A and 4B has a different configuration from the LOG-type signal line group LOGG shown in FIGS. 3A and 3B in that the gate low voltage signal line 52 is made from a source/drain metal while the remaining gate driving signal lines 50 are made from a gate metal.

In the liquid crystal display panel shown in FIGS. 4A and 4B, as the LOG-type signal line group LOGG is provided separately at different metal layers having the gate insulating film 44 therebetween, an area of the LOG-type signal line group LOGG can be set as large as possible even within the confined area. Particularly, the gate low voltage signal line 52 for transferring a gate low voltage Vgl critically affecting picture quality of the picture display part in the gate driving signals is formed from a source/drain metal, whereas other gate driving signal lines 50 are formed from a gate metal. In this case, the gate low voltage signal line 52 provided at the source/drain metal layer are positioned in such a manner to overlap with other gate driving signal lines 50 provided at the gate metal layer. Thus, an area, that is, a line width of the gate low voltage signal line 52 is set as large as possible such that it corresponds to the entire outer area, thereby minimizing resistance value enough to not affect picture quality. In addition, since a resistance of the source/drain metal is smaller than that of the gate metal, it is possible to reduce a resistance value of the gate low voltage signal line 52. Also, the LOG-type signal lines 50 for transferring the remaining gate driving voltages other than the gate low voltage Vgl can have a larger line width than the prior art provided at the gate metal layer along with the gate low voltage signal line, so that their resistance value also can be reduced.

Hereinafter, a method of manufacturing such a LOG-type signal line group LOGG will be described in conjunction with a thin film transistor array process of the lower substrate, however the process is not shown in the drawings.

First, a gate metal is deposited onto the lower substrate 40 and then patterned, to thereby provide the LOG-type signal lines 50 excluding the gate low voltage Vgl along with gate electrodes, gate lines and gate pads of the thin film transistor. Next, an active layer of the thin film transistor is formed by entirely coating the gate insulating film 44 thereon and thereafter depositing amorphous silicon and then patterning. Subsequently, a source/drain metal is deposited and then patterned to thereby provide the gate low voltage signal line 52 along with source/drain electrodes, data lines and data pads of the thin film transistor. After the protective film 48 was entirely coated, contact holes for exposing gate pads and data pads, pads of the LOG-type signal line group LOGG and a drain electrode of the thin film transistor, etc. are provided. Herein, the gate pads and the pads of the LOG-type signal lines 50 provided at the gate metal layer are exposed via a contact hole passing through the gate insulating film 44 and the protective film 48, whereas the drain electrode, the data pads and the pads of the gate low voltage signal line 52 provided at the source/drain metal layer are exposed via a contact hole passing through the protective film 48. Finally, a transparent conductive material is deposited and then patterned to thereby provide a pixel electrode connected to the drain electrode and a protective electrode connected to the gate pads, the data pads and the pads of the LOG-type signal line group LOGG.

As described above, according to the present invention, the LOG-type signal lines are provided separately at different metal layers having the insulating film therebetween to enlarge their area within the confined area to thereby reduce a resistance value, so that it is possible to minimize a signal attenuation caused by a resistance value thereof. Particularly, the gate low voltage signal line greatly affecting picture quality of the picture display part is formed from a metal layer different from other gate driving signal lines, thereby setting a line width of the gate low voltage signal line as large as possible within the confined outer area. Accordingly, a resistance value of the gate low voltage signal line is minimized and a difference of the gate low voltage supplied for each gate driver IC is minimized, so that it becomes possible to prevent a cross-line phenomenon between horizontal line blocks connected to each driver IC.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A line on glass type liquid crystal display panel, comprising:

a picture display part having a plurality of liquid crystal cells, each of which is arranged at each crossing area between gate lines and data lines;

data tape carrier packages ("TCPs") connected with one side of the liquid crystal display panel for driving the data lines, wherein the data TCPs include data driver integrated circuits ("ICs") and are electrically connected with a data printed circuit board ("PCB") for driving the data lines, respectively, gate TCPs connected with one side of the liquid crystal display panel for driving the gate lines, wherein the gate TCPs include gate driver ICs for driving the gate lines, respectively, and line on glass type ("LOG") signal lines being provided at an outer area of the picture display part, wherein the LOG signal lines are located between a first data TCP and a first gate TCP, physically separated from the gate lines, and apply gate driving signals received from a timing controller and a power supply through the data PCB and the first data TCP to the gate driver ICs, wherein the gate driving signals include at least a gate low voltage, a gate high voltage, a ground voltage, a supply voltage, a gate start pulse and gate shift clock signals;

wherein the LOG signal lines includes first LOG signal line, applying the gate low voltage, and second LOG signal lines, applying different gate driving signals, that are separately provided at different metal layers having an insulating film therebetween, and a width of the first LOG signal line applying the gate low voltage is greater than each width of the second LOG signal lines applying the different gate signals, so that the first LOG signal line applying the gate low voltage prevents a cross-line phenomenon between blocks respectively connected to the gate driver ICs, wherein the first LOG signal line applying the gate low voltage overlaps at least three second LOG signal lines applying the different gate driving signals over/below the second LOG signal lines, the first LOG signal line is formed along the at least three second LOG signal lines at an entire area between the at least three second LOG signal lines, the first LOG signal line is longitudinally parallel with the at least three second LOG signal lines and the width of the first LOG signal line is greater than a sum of width of the at least three second LOG signal lines.

2. The line on glass type liquid crystal display panel according to claim 1, wherein the LOG signal lines are provided separately at a gate metal layer and a source/drain metal layer that have the gate insulating film therebetween.

3. The line on glass type liquid crystal display panel according to claim 1, wherein the second LOG signal lines further comprises a LOG signal line supplying a common voltage required for a common electrode included in the picture display part.

4. The line on glass type liquid crystal display panel according to claim 3, wherein the first LOG signal line is formed from a gate metal layer and the second LOG signal lines are formed from a source/drain metal layer.

5. The line on glass type liquid crystal display panel according to claim 3, wherein the first LOG signal line is formed from a source/drain metal layer and the second LOG signal lines are formed from a gate metal layer.

* * * * *